Patented June 24, 1941

2,247,204

UNITED STATES PATENT OFFICE 2,247,204

METHOD OF PRODUCING MOLDABLE LIGNO-CELLULOSE AND PRODUCT THEREOF

Arlie W. Schorger and John H. Ferguson, Madison, Wis., assignors to Burgess Cellulose Company, Freeport, Ill., a corporation of Delaware No Drawing. Application July 16, 1938, Serial No. 219,596

8 Claims. (Cl. 106—163)

The object of this invention is to provide an improved cooking process for natural lignocellulosic materials to produce from them a product that can be molded under heat and pressure into a mass that is dense, hard, strong and water-resistant.

Our invention provides an improved cooking process for lignocellulosic materials whereby stronger molded products are obtained than heretofore possible in the process in which natural lignocellulosic materials such as wood, corn cobs, straw, bagasse, cornstalks, etc., are cooked with water at elevated temperatures to render water-soluble a part of the lignocellulosic material, and particularly to dissolve the hemicelluloses. The residual product, after extraction of the water solubles and subsequent drying, contains a large part of the original thermoplastic resinous lignin, as well as cellulosic fibre intrinsically unchanged. This product, usually after being further disintegrated mechanically to a powder is hot-molded under pressure but without the addition of a binder, into a hard, resinous product having a high strength and a high resistance to the absorption of water.

Various methods have been suggested for making a moldable product from the lignocelluloses. In one case (U. S. Patent 1,932,255) the base is a lignocellulose that has been hydrolyzed by the use of a dilute mineral acid under heat and pressure. In another case (U. S. Patent 2,080,077) the lignocellulose is treated with water under pressure or steam. It has been proposed also (U. S. Patents 1,792,254 and 2,056,810) to cook the lignocellulose with strong caustic soda for 18 to 22 hours. The lignin, for the most part, is dissolved by the alkali, but the cooking is prolonged until there is an acid reaction in order to reprecipitate the lignin, or resins, on the cellulose fibers.

When a lignocellulose such as wood is heated with water at a temperature high enough to produce a suitable moldable product, this temperature preferably being at least 185° C. and sometimes exceeding 200° C., a large part of the hemicelluloses is dissolved and appreciable amounts of organic acids are split off by hydrolysis. If a hardwood is digested with a dilute alkali at boiling temperature about six per cent of acid, calculated as acetic acid is split off from the wood. When such alkali is present the minimum cooking temperature usually is higher than when water alone is used if suitable flow of the resultant plastic is to be obtained.

We have made the important discovery that if the wood is cooked with water containing a limited amount of a readily soluble alkali, the resultant product is more plastic and the molded product is improved in strength. It is desirable to use a readily soluble alkali in order to penetrate the wood easily and quickly and neutralize for the most part the organic acids as soon as they are formed, that is, in situ. If calcium carbonate or a limited amount of calcium hydroxide is present, the cooked wood shows improved properties over a cook with water alone, but still better results are obtained by the use of a readily soluble alkali such as sodium carbonate or sodium hydroxide. It is well known that cellulose is converted into brittle hydrocellulose when heated under appropriate conditions with organic or inorganic acids and it therefore is desirable to neutralize these as soon as they are formed. Neither calcium carbonate nor calcium hydroxide are sufficiently soluble, under the conditions under which the cook is made, to penetrate the wood and neutralize the acids formed before the cellulose has been decreased in strength.

The chemical used for neutralizing the acids should have a solubility in water of at least one per cent at 100° C. when cooking under the conditions stated above. Suitable hydroxides are those of barium, strontium, lithium, sodium, potassium and ammonium. There may be used also the salts of weak acids such as the carbonates and bicarbonates of sodium, potassium and ammonium and the sulphides of sodium, potassium, barium and strontium. Good results have also been obtained by using suitable amounts of salts having an alkaline reaction such as borax, trisodium phosphate, normal sodium sulfite alone or mixed with caustic soda, and urea that decomposes in part to ammonia. Caustic soda is a preferred material.

The amount of the alkaline material to be added to the cook varies with the kind of lignocellulose and must be determined by trial. More should be used with hard woods (angiosperms) than with conifers or soft woods (gymnosperms).

The lignin should be left in situ, hence the amount of the chemical should be insufficient to bring an appreciable amount of the lignin into solution. The uniform natural coating of the cellulose by the lignin is not only in itself advantageous but we have found that once the lignin is brought into solution only about three-fourths can be reprecipitated on acidification. Our procedure avoids the loss of lignin which results if too much alkali is used. There is a further advantage in that it is not necessary to pay so much attention to uniformity of size of raw material to prevent partial overcooking and undercooking.

The plasticity and bond of the treated lignocellulose is due largely to the lignin. Increased plasticity can be obtained very advantageously by our procedure by cooking the lignocellulose in "black liquor" obtained from the chemical pulping of wood by the soda and sulphate processes. This "black liquor" contains the necessary free alkali and the lignin also contained in it increases the lignin content of the product, thereby increasing its plasticity and bond. The amount of "black liquor" used may be based on the percentage of sodium hydroxide present in the natural liquor or if a further enrichment in lignin is desired the "black liquor" may be partially neutralized with an acid such as sulphuric acid. During the cooking of the lignocellulose the residual alkali in the "black liquor" combines with the acids split off the lignocellulose and the lignin in the "black liquor" is for the most part precipitated. In this way the lignocellulose is maintained at high strength and at the same time is enriched with lignin.

The amount of chemical used in cooking the lignocellulose should be such that at the end of the short cooking period (usually one hour) the mass reacts acid. The acidity should be insufficient, however, to attack the cellulose so that it is weakened appreciably. Usually the pH of the liquor at the end of the cook is about 5.0 to 6.0 but it need not necessarily be in this range. Preferably the amount of alkaline material should be such that the lignocellulose remains slightly acid after cooking for less than three hours. As stated previously, the optimum conditions as to species of lignocellulose and amount of chemical must be determined by trial, the hard woods requiring increased amounts over the soft woods. It is obvious that the time of cooking varies at a rate which is inverse to the size of the particles used which may vary from sawdust particles to chips.

As an example of our process, the results given below were obtained with ash wood, by cooking with an equal weight of solution for one hour at about 195° C., a preferred temperature. The resultant material, after washing thoroughly, was pulverized to 60 mesh and hot pressed at 185° C. and 3000 pounds per square inch.

| No. | Percent NaOH based on wood (air dried weight) | Modulus of rupture, pounds per sq. in. | Percent water absorption, 24 hours |
| --- | --- | --- | --- |
| 1 | 0 | 6,400 | 3.11. |
| 2 | 3 | 8,900 | 2.88. |
| 3 | 4 | 9,500 | 2.77. |
| 4 | 5 | 9,000 | 2.18. |
| 5 | 6 | 10,150 | 2.53. |
| 6 | 7 | 9,500 | 7.20. |
| 7 | 8 | 7,650 | Disintegrated. |
| 8 | 9 | 4,700 | Do. |
| 9 | (3% CaCO$_3$) | 8,120 | 3.52. |

The above data show that with ash wood the best results are obtained by using 5% to 6% of sodium hydroxide. With 8% of sodium hydroxide the reaction mass was neutral but the strength and plasticity had dropped, and the water resistance was very poor. A coniferous soft wood such as white or yellow pine requires a much smaller amount of alkali, usually 3% or less.

In case it is desired to cook the lignocellulose with steam rather than with water under pressure, the lignocellulose is impregnated as uniformly as possible with a suitable solution of the alkali prior to steaming.

In the table below are given the results obtained with ash wood under the same conditions as above but using sodium carbonate.

| No. | Percent Na$_2$CO$_3$ based on wood | Modulus of rupture, pounds per sq. in. | Percent water absorption, 24 hours |
| --- | --- | --- | --- |
| 1 | 3 | 8,300 | 3.84 |
| 2 | 4 | 9,500 | 3.06 |
| 3 | 5 | 9,050 | 3.36 |
| 4 | 6 | 9,350 | 3.91 |
| 5 | 7 | 9,800 | 5.50 |
| 6 | 8 | 9,100 | 11.30 |

Mixtures of the above alkalies may be used. Although these alkalies may also be used in conjunction with the less soluble basic agents such as calcium hydroxide and the alkaline earth carbonates, the readily soluble alkaline materials are the primary materials used for neutralizing the acids formed. Other materials such as aniline, formaldehyde or dimethylaniline may be added to the cooking liquor to modify the product obtained without departing from the scope of the invention as defined by the claims. This application is a continuation in part of our prior copending application Serial No. 184,768, filed January 13, 1938.

We claim:

1. The method of forming a thermoplastic lignocellulosic composition capable of being molded under heat and pressure into hard, resinous products which comprises water-cooking a subdivided natural lignocellulose for less than 3 hours at a temperature of approximately 185° C. to 200° C. in the presence of an alkaline substance having a water-solubility of at least 1% at 100° C. to form a thermoplastic product, said alkaline substance being present in an amount sufficient to neutralize the acids liberated from the natural lignocellulose during the cook and having an acid-neutralizing power equivalent to that of approximately 1% to 7% sodium hydroxide, based on the air dry weight of said natural lignocellulose, and washing and drying the cooked material.

2. The method of forming a thermoplastic lignocellulosic composition capable of being molded under heat and pressure into hard, resinous products which comprises water-cooking a subdivided natural lignocellulose for less than 3 hours at a temperature of approximately 185° C. to 200° C. in the presence of an alkaline substance having a water-solubility of at least 1% at 100° C. to form a thermoplastic product, said alkaline substance being present in an amount sufficient to neutralize the acids liberated from the natural lignocellulose during the cook and having an acid-neutralizing power equivalent to that of approximately 1% to 7% sodium hydroxide, based on the air dry weight of said natural lignocellulose, and washing, drying and reducing the cooked material to a powder.

3. The process of claim 2 in which the alkaline substance comprises one of the group consisting of the readily soluble alkaline hydroxides, carbonates, bicarbonates, sulfides, sulfites, triphosphates and borates of the alkali metals, of the alkaline earth metals, and of ammonium.

4. The method of claim 2 in which the alkaline substance for the cooking operation is supplied by a "black liquor."

5. The method of forming a thermoplastic lignocellulosic composition capable of being molded under heat and pressure into hard, resinous products which comprises water-cooking a subdivided natural lignocellulose for less than 3 hours at a temperature of approximately 185° C. to 200° C. in the presence of an alkaline substance having a water-solubility of at least 1% at 100° C. to form a thermoplastic product, said alkaline substance being present in an amount suffifficient to neutralize the acids liberated from the natural lignocellulose during the cook and sufficient to produce a pH of approximately 5.0 to 6.0 in the cooked mass at the end of the cook, and washing, drying and reducing the cooked material to a powder.

6. The method of forming a hard, resinous product which comprises water-cooking a subdivided natural lignocellulose for less than 3 hours at a temperature of approximately 185° C. to 200° C. in the presence of an alkaline substance having a water-solubility of at least 1% at 100° C. to form a thermoplastic product, said alkaline substance being present in an amount sufficient to neutralize the acids liberated from the natural lignocellulose during the cook and having an acid-neutralizing power equivalent to that of approximately 1% to 7% sodium hydroxide, based on the air dry weight of said natural lignocellulose, washing, drying and reducing the cooked material to a powder, and subjecting said powder to heat and pressure suitable for molding.

7. The process of claim 2 in which the alkaline material is largely caustic soda.

8. The process of claim 2 in which the alkaline material is largely sodium carbonate.

ARLIE W. SCHORGER.
JOHN H. FERGUSON.